(12) United States Patent
Masumoto et al.

(10) Patent No.: US 11,251,868 B2
(45) Date of Patent: Feb. 15, 2022

(54) DISPERSION COMPENSATION SYSTEM AND DISPERSION COMPENSATION METHOD

(71) Applicant: Nippon Telegraph and Telephone Corporation, Tokyo (JP)

(72) Inventors: Kana Masumoto, Tokyo (JP); Masahiro Nakagawa, Tokyo (JP); Toshiya Matsuda, Tokyo (JP); Hidetoshi Onda, Tokyo (JP); Masaru Katayama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/254,803

(22) PCT Filed: Jun. 20, 2019

(86) PCT No.: PCT/JP2019/024481
§ 371 (c)(1),
(2) Date: Dec. 21, 2020

(87) PCT Pub. No.: WO2020/004215
PCT Pub. Date: Jan. 2, 2020

(65) Prior Publication Data
US 2021/0266069 A1    Aug. 26, 2021

(30) Foreign Application Priority Data

Jun. 29, 2018 (JP) .............................. JP2018-124396

(51) Int. Cl.
*H04B 10/2513* (2013.01)
*H04B 10/079* (2013.01)
(Continued)

(52) U.S. Cl.
CPC ..... *H04B 10/2513* (2013.01); *H04B 10/0795* (2013.01); *H04B 10/275* (2013.01); *H04L 7/0075* (2013.01)

(58) Field of Classification Search
CPC . H04L 7/0075; H04B 10/2513; H04B 10/275; H04B 10/0795
(Continued)

(56) References Cited

U.S. PATENT DOCUMENTS 7,433,594 B2 * 10/2008 Takachio ............. H04B 10/271
398/4
7,599,620 B2 * 10/2009 Graves ............... H04Q 11/0066
398/51
(Continued)

FOREIGN PATENT DOCUMENTS

JP    2001-257698    9/2001
JP    2008-271073    11/2008
(Continued)

OTHER PUBLICATIONS

Eggleton et al., "Integrated Tunable Fiber Gratings for Dispersion Management in High-Bit Rate Systems." Journal Of Lightwave Technology, Oct. 2000, 18(10):1418-1432, 15 pages.

*Primary Examiner* — Abbas H Alagheband
(74) *Attorney, Agent, or Firm* — Fish & Richardson P.C.

(57) ABSTRACT

An object is to provide a dispersion compensating system with a large amount of dispersion compensation and reduced operation costs.
Disclosed is a dispersion compensating system in which a core node and an access node are connected through a ring network, the access node includes a delay measurement unit configured to receive delay measurement signals from the core node to measure a delay between the core node and the access node, an average dispersion amount calculation unit configured to calculate an amount of dispersion compensa- (Continued)

tion to be applied to an optical burst signal prior to transmission to the ring network, based on the delay thus measured, and a real-part inverse dispersion application unit configured to perform pre-equalization on a waveform of the optical burst signal prior to the transmission, based on the calculated amount of dispersion compensation.

4 Claims, 12 Drawing Sheets

(51) Int. Cl.
  *H04B 10/275* (2013.01)
  *H04L 7/00* (2006.01)
(58) Field of Classification Search
  USPC .......................................................... 398/29
  See application file for complete search history.

(56) References Cited

U.S. PATENT DOCUMENTS

| | | | | |
|---|---|---|---|---|
| 7,933,517 | B2* | 4/2011 | Ye | H04B 10/077 398/3 |
| 8,089,865 | B2* | 1/2012 | Mizutani | H04L 12/437 370/223 |
| 8,300,659 | B2* | 10/2012 | Hinderthuer | H04Q 11/0071 370/466 |
| 9,584,217 | B2* | 2/2017 | Bottari | H04J 3/0661 |
| 9,838,112 | B2* | 12/2017 | Grobe | H04L 7/0075 |
| 10,523,323 | B2* | 12/2019 | Kang | H04B 10/07951 |
| 10,801,918 | B2* | 10/2020 | Adams | G01M 11/333 |
| 2003/0025961 | A1* | 2/2003 | Way | H04J 14/0212 398/59 |
| 2005/0159914 | A1* | 7/2005 | Sunden | H04W 56/0015 702/125 |
| 2007/0031146 | A1* | 2/2007 | Takachio | H04J 14/0283 398/4 |
| 2008/0131122 | A1* | 6/2008 | Reisslein | H04J 14/0245 398/59 |
| 2010/0226244 | A1* | 9/2010 | Mizutani | H04L 45/28 370/220 |
| 2015/0104167 | A1* | 4/2015 | Bottari | H04B 10/2513 398/16 |

FOREIGN PATENT DOCUMENTS

| | | |
|---|---|---|
| JP | 2008-312071 | 12/2008 |
| JP | 2011-193077 | 9/2011 |

* cited by examiner

DISPERSION COMPENSATION SYSTEM AND DISPERSION COMPENSATION METHOD

CROSS-REFERENCE TO RELATED APPLICATIONS

This application is a National Stage application under 35 U.S.C. § 371 of International Application No. PCT/JP2019/024481, having an International Filing Date of Jun. 20, 2019, which claims priority to Japanese Application Serial No. 2018-124396, filed on Jun. 29, 2018. The disclosure of the prior application is considered part of the disclosure of this application, and is incorporated in its entirety into this application.

TECHNICAL FIELD

The present disclosure relates to a dispersion compensating system and a dispersion compensating method.

BACKGROUND ART

In aggregation optical network systems for metro networks with a traffic capacity of several tens [Gbps], low-cost, power-saving, efficient aggregation of traffic is required. To enable this, it is effective for each device connected to such an aggregation optical network to use a device employed in a passive optical network (PON) system (hereinafter, a PON device), and to multiplex an optical burst signal of a large volume on one optical fiber in an optical time division multiplexing (TDM) technique, to thereby transmit and/or receive the burst signal.

FIG. 9 is a configuration diagram illustrating an example of an aggregation optical ring system.
The aggregation optical ring system includes a core node 91, which is a PON device of an optical line terminal (OLT), and access nodes 92 (92a, 92b, and 92c), which are PON devices of optical network units (ONUs), the core node 91 and the access nodes 92 being connected through a ring network 93 in a predetermined direction (clockwise in FIG. 9). The ring network 93 has a multi-stage node connection configuration, in which a plurality of nodes are connected within one ring, and each two nodes are separated at a distance of approximately 10 km to 25 km. Optical burst signals output from the respective access nodes 92 are time-multiplexed (time-divided) and received at the core node 91 collectively.
Note that, although not illustrated in the drawing, the core node 91 is connected to a core network and serves as a relay device between the core network and the ring network 93. Similarly, each of the access nodes 92 is connected to an access network and serves as a relay device between the access network and the ring network 93.

Communication starting from the core node 91, sequentially passing through the access node 92c, the access node 92b, and the access node 92a, and returning to the core node 91 will be considered below.
First, at an output destination 901 of the core node 91, no signal is passing through the ring network 93 yet. Note that optical burst signals passing through the ring network 93 are wavelength-multiplexed, and FIG. 9 illustrates an example in which optical burst signals are multiplexed only on a wavelength λ1 of three wavelengths λ1, λ2, and λ3.
Next, when receiving two signals W1 and W3 from the accommodating access network (reference signal 902), the access node 92c adds the signals W1 and W3 to the ring network 93. Thus, at an output destination 903 of the access node 92c, the two signals W1 and W3 pass, being time-divided into separate time slots under timing control by the access node 92c.

When receiving a signal W2 from the accommodating access network (reference signal 904), the access node 92b adds the signal W2 to the ring network 93. Consequently, at the output destination 905 of the access node 92b, the signals W1 and W3 passing from the access node 92c, in addition to the signal W2 thus added, are time-divided into separate time slots and passes. Because the access node 92a does not have any signal from the accommodating access network, the access node 92a directly transfers the signals from the output destination 905 of the access node 92b to the core node 91. This allows the core node 91 to receive the three signals W1, W2, and W3 from the access nodes 92.

FIG. 10 is an explanatory diagram illustrating wavelength dispersion that occurs at the time of fiber transmission in the aggregation optical ring system in FIG. 9.
The core node 91 collectively receives the signal W1 added by the access node 92c (reference sign 911), the signal W2 added by the access node 92b (reference sign 912), and the signal W3 added by the access node 92a (reference sign 913). Here, in each of the signals W1 to W3, wavelength dispersion (hereinafter referred to as "dispersion") occurs corresponding to the wavelength 21 and the transmission distance from a corresponding one of the access nodes 92 to the core node 91.

"Dispersion" is a phenomenon in which a delay occurs in light propagation rate due to wavelength. The waveform of an optical signal that has propagated a medium with dispersion characteristics, such as an optical fiber, spreads out. Thus, dispersion causes nonlinear effects, an increase in bit error rate, and/or degradation in signal quality.
The degree of dispersion occurring in an optical burst signal is referred to as a "dispersion amount" and uses [ps/nm] as a unit. The term ps denotes a spread of pulse (delay time), and nm denotes a wavelength corresponding to the spectral width of the optical signal.

Thus, "dispersion compensation" is a technique for reducing the amount of dispersion occurring in an optical burst signal by the amount of dispersion compensation to thereby bring the amount of dispersion after dispersion compensation close to zero [ps/nm]. Note that the dispersion compensation capacity of a receiver of the optical burst signal is proportional to the square of the transmission rate. In other words, the accuracy of the amount of dispersion compensation needs to be increased with the transmission rate. For example, NPL1 describes, as examples of dispersion compensation capacity, approximately 800 [ps/nm] at a transmission rate of 10 [Gbps] and approximately 50 [ps/nm] at 40 [Gbps].

The amount of dispersion is calculated by the product of the dispersion characteristics of the optical fiber itself (the unit is [ps/nm·km]) through which the optical burst signal is transmitted and the transmission distance of the optical burst signal (the unit is [km]). The dispersion characteristics of typical fibers used in metro networks are described below:
 single mode optical fiber (single mode fiber (SMF)): dispersion characteristics of 13.3 to 18.6 [ps/nm·km] in a band of 1.55 [μm] (G.652 standard)
 dispersion shifted single mode optical fiber (dispersion shifted fiber (DSF)): dispersion characteristics of −2.3 to +2.3 [ps/nm·km] in a band of 1.55 [μm] (G.653 standard).
In FIG. 10, the distance to the core node 91 for the burst signal to pass is different for each access node 92 serving as a transmission side, and hence the amount of dispersion also varies from one burst signal to another. For example, assume that a single mode optical fiber having an inter-node distance of 25 [km] and dispersion characteristics of 17 [ps/nm·km] is used. Regarding the amounts of dispersion D1 to D3 of the respective signals indicated by reference sign 914, the amount of dispersion increases as the distance from the transmission side becomes larger.

The amount of dispersion D1 of the signal W3=4250 [ps/nm]

The amount of dispersion D2 of the signal W2=2125 [ps/nm]

The amount of dispersion D3 of the signal W1=425 [ps/nm]

The periods of time slots in which these signals W1 to W3 pass are very short, for example, 10 [μs], and hence it is necessary to instantaneously set a suitable amount of dispersion compensation for each signal in such a short time period.

As techniques for compensating for such dispersion described above, a technique using a dispersion compensating fiber (DCF) for the span between each two nodes (to be described later using FIG. 11) and a technique using an electrical dispersion compensator (EDC) for a burst receiver in each node as that described in PTL 1 (to be described later using FIG. 12) are known.

FIG. 11 is a configuration diagram of a dispersion compensating system using DCFs. In FIGS. 9 and 10 above, a single clockwise ring is illustrated as the ring network 93 for ease of explanation. However, in FIG. 11, a two-ring configuration is illustrated including an outer ring in a clockwise direction and an inner ring in a counterclockwise direction.

Each node includes an optical amplifier configured to amplify an optical burst signal passing through the ring network 93 and a coupler for branching the optical burst signal for add/drop (illustration is partially omitted in FIG. 11).

A DCF is laid in the span between each two nodes in the ring network 93. Note that, because the range of the amount of dispersion of SMF defined in G.652 standard is wide, the dispersion characteristics vary greatly from one fiber to another. For this reason, dispersion measurement equipment for measuring the dispersion characteristics for each span and installing a DCF having an optimal fiber length is provided between each of burst transceivers 91TRx and 92TRx of the respective nodes and the ring network 93.

The DCF is a fiber that provides, to dispersion occurring in the corresponding optical burst signal, the amount of dispersion compensation for compensating for the dispersion. By providing this DCF in each span, an optical burst signal passing through a larger number of spans is provided with a larger amount of dispersion compensation. This consequently reduces the amount of dispersion corresponding to the transmission distance from each of the access nodes 92 at the time when the core node 91 collectively receives optical burst signals from the respective access nodes 92.

FIG. 12 is a configuration diagram of a dispersion compensating system using EDCs. The core node 91 that collectively receives optical burst signals from the respective access nodes 92 in the aggregation optical ring system in FIG. 10 includes a burst receiver 91Rx using an EDC, in addition to the burst transmitter 91Tx. The burst receiver 91Rx includes the following components.

An avalanche photodiode (APD) converts an optical signal into a current signal.

A burst transimpedance amplifier (burst TIA) converts, while amplifying, a current signal into a voltage signal.

A burst limiting amplifier (burst LA) converts a faint voltage signal or a relatively large voltage signal into a voltage signal of a constant amplitude.

An EDC, after converting a received optical signal into an electrical signal, compensates for a signal waveform degraded due to wavelength dispersion. The EDC is a filter that equalizes a waveform distorted by dispersion, with frequency characteristics corresponding to the amount of dispersion. Note that, because an EDC is required for each burst receiver 91Rx, the number of required EDCs increases as the number of wavelengths of optical burst signals to be wavelength-multiplexed increases.

A burst clock and data recovery circuit (burst CDR) extracts the timing of a voltage signal of a constant amplitude to shape a waveform with a low noise clock.

According to the configuration in FIG. 12, it is possible, by using an electrical compensation dispersion circuit, to compensate for a signal waveform degraded due to dispersion after conversion of a received signal into an electrical signal. Note that it is easy to reduce the costs of EDCs, which can be mass-produced, and that no pre-design is necessary because the amount of dispersion can be compensated in real time.

CITATION LIST

Patent Literature

PTL1: JP 2008-271073A

Non Patent Literature

NPL1: B. J. Eggleton, et al. "Integrated tunable fiber grating for dispersion management in high-bit rate systems" J. Lightwave Technol., vol. 18, no. 10, pp. 1418-1432, October 2000.

SUMMARY OF THE INVENTION

Technical Problem

In an attempt of building a well-balanced dispersion compensating system in terms of accuracy improvement for increasing the amount of dispersion compensation and operation for reducing the operation costs without the need for manual pre-design, DCFs and EDCs, which are for dispersion compensation of conventional art, have both advantages and disadvantages as will be described below and hence fail to satisfy both of the above aims in a well-balanced manner. First, the DCFs in FIG. 11 are insufficient in terms of operation. Because a DCF has a greater propagation loss than that of an SMF, manual pre-design of the entire ring network 93 is needed to determine the amount of compensation for each span.

In contrast, the amount of dispersion compensation is limited with the EDC in FIG. 12, and hence the EDC is insufficient in terms of accuracy improvement. Regarding EDCs, the instantaneous variable amount of dispersion that can be compensated is up to 1000 [ps/nm] according to previous reports, and this indicates that the EDCs do not support instantaneous compensation of the amount of dispersion of several hundreds to several thousands [ps/nm] such as in metro networks.

In view of the above, a main object of the present disclosure is to provide a dispersion compensating system with a large amount of dispersion compensation and reduced operation costs.

Means for Solving the Problem

In order to solve the above-described problem, a dispersion compensating system of the present disclosure has the following features.

The present disclosure is a dispersion compensating system including: a core node and an access node that are connected through a ring network constituted of an optical fiber, the access node including: a delay measurement unit configured to receive delay measurement signals from the core node to measure a delay between the core node and the access node; a dispersion compensation amount calculation unit configured to calculate an amount of dispersion compensation to be applied to an optical burst signal prior to transmission to the ring network, based on the delay thus measured; and an inverse dispersion application unit configured to perform pre-equalization on a waveform of the optical burst signal prior to the transmission, based on the calculated amount of dispersion compensation.

With this, the inverse dispersion application unit performs pre-dispersion compensation processing on a waveform of an optical burst signal prior to transmission by means of pre-equalization, and this allows the optical burst signal with an appropriate amount of dispersion compensation to be transmitted compared to a method in which post-dispersion compensation processing is performed after transmission of an optical burst signal. Furthermore, because the amount of dispersion compensation is calculated by the dispersion compensation amount calculation unit, no network design pre-assuming the amount of dispersion compensation is needed, whereby the operation costs can be reduced.

In the present disclosure, the core node transmits two signals of a plurality of wavelengths and different powers as the delay measurement signals, to the access node, and the dispersion compensation amount calculation unit of the access node calculates an amount of dispersion compensation at a center wavelength between the wavelengths of the two signals.

With this, an optical burst signal, which is a master signal, and delay measurement signals, which are slave signals, are distinguishable based on a power difference, whereby the access node can reliably receive the delay measurement signals.

In the present disclosure, the delay measurement unit of the access node uses, as the delay between the core node and the access node, a delay measured for time synchronization between the core node and the access node in discovery processing activated when a new instance of the access node is connected to the ring network.

With this, because processing for measuring delay information that varies according to the state of a ring network can be performed by taking advantage of the existing discovery processing, the measurement load can be reduced.

Effects of the Invention

According to the present disclosure, it is possible to provide a dispersion compensating system with a large amount of dispersion compensation and reduced operation costs.

DESCRIPTION OF EMBODIMENTS

An embodiment of the present disclosure will be described below in detail with reference to the drawings.

Figure 1:
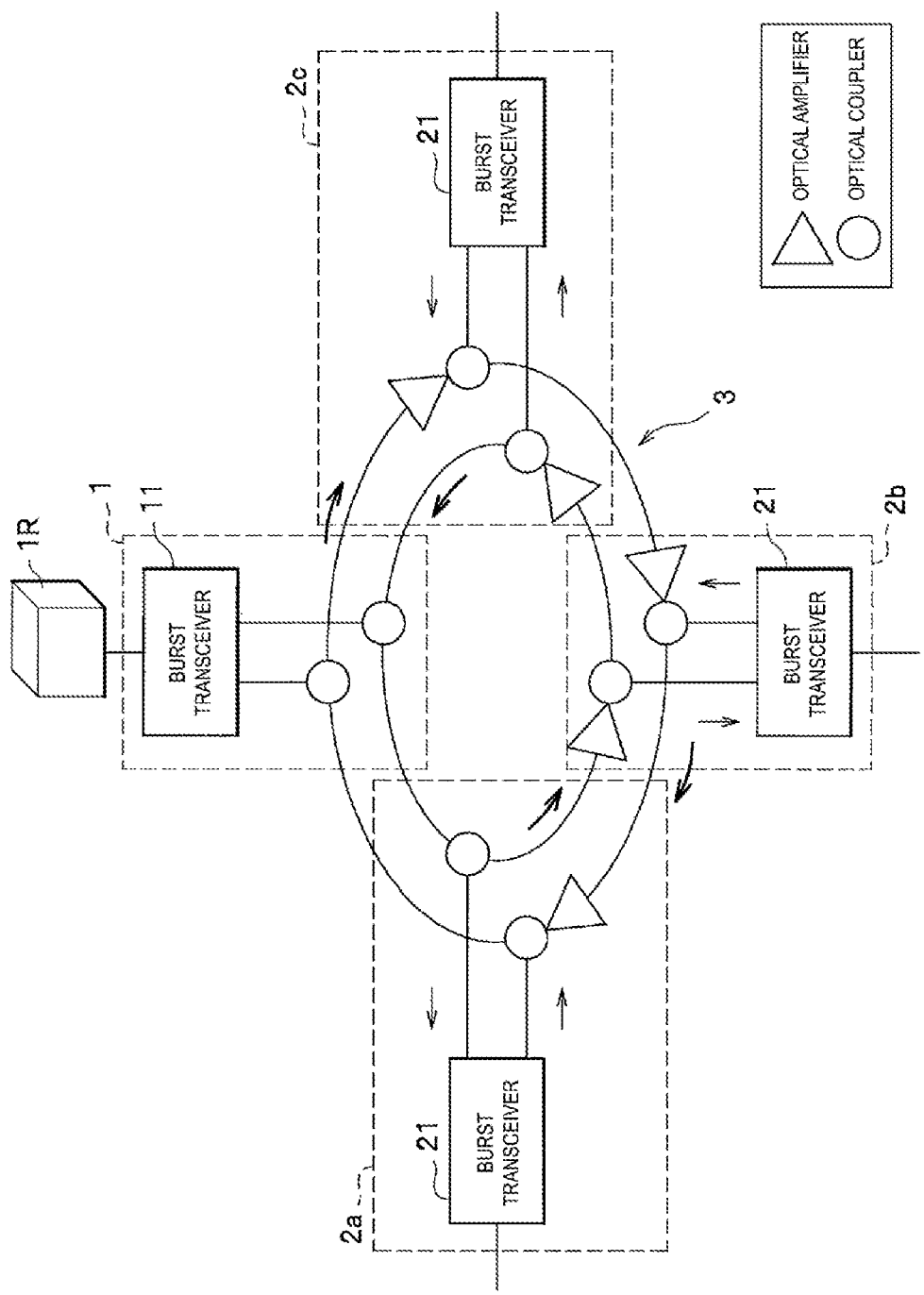
FIG. 1 is a configuration diagram of a dispersion compensating system according to the present embodiment.
Figure 11:
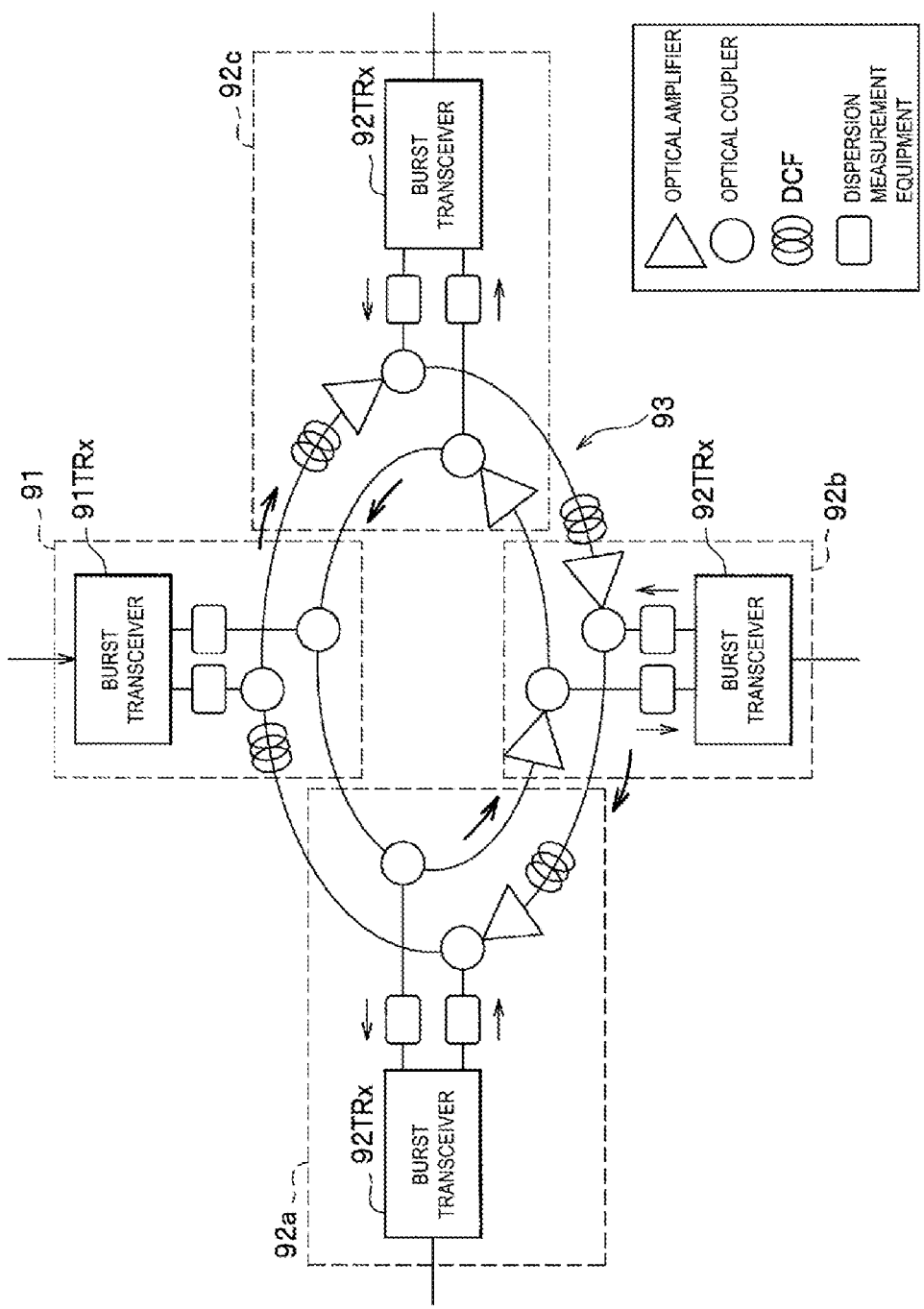
FIG. 11 is a configuration diagram of a dispersion compensating system using DCFs.
Figure 12:
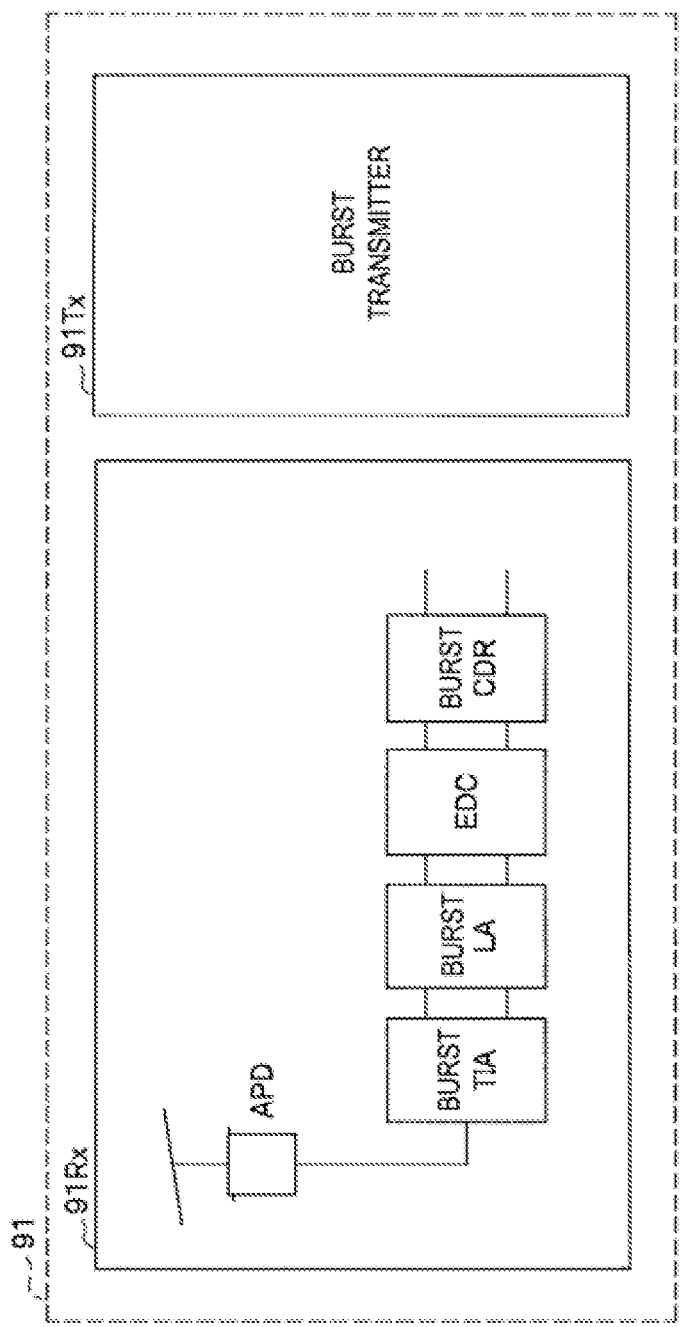
FIG. 12 is a configuration diagram of a dispersion compensating system using an EDC.

FIG. 1 is a configuration diagram of a dispersion compensating system. It is assumed also in FIG. 1, similarly to FIG. 11, to employ a two-ring configuration including an outer ring in a clockwise direction and an inner ring in a counterclockwise direction. The dispersion compensating system is configured by connecting a core node 1, which is a PON device, and access nodes 2 (2a, 2b, and 2c), which are PON devices, by a ring network 3.

Each of the nodes (the core node 1 and the access nodes 2) is configured as a computer that includes a central processing unit (CPU), a memory, storage means (storage unit) such as a hard disk, and a network interface.

In this computer, the CPU executes a program (also referred to as an application or an app, which is an abbreviation for application) read into the memory, so that a control unit (control means) configured by various processing units operates.

A burst transceiver 21 of each of the access nodes 2 transmits and/or receives, as a master signal, an optical burst signal passing through the ring network 3. A burst transceiver 11 of the core node 1 also transmits and/or receives, as a master signal, an optical burst signal passing through the ring network 3. In FIG. 1, similarly to FIG. 11, each node includes an optical amplifier configured to amplify an optical burst signal passing through the ring network 3 and a coupler for branching the optical burst signal for add/drop.

Figure 2:
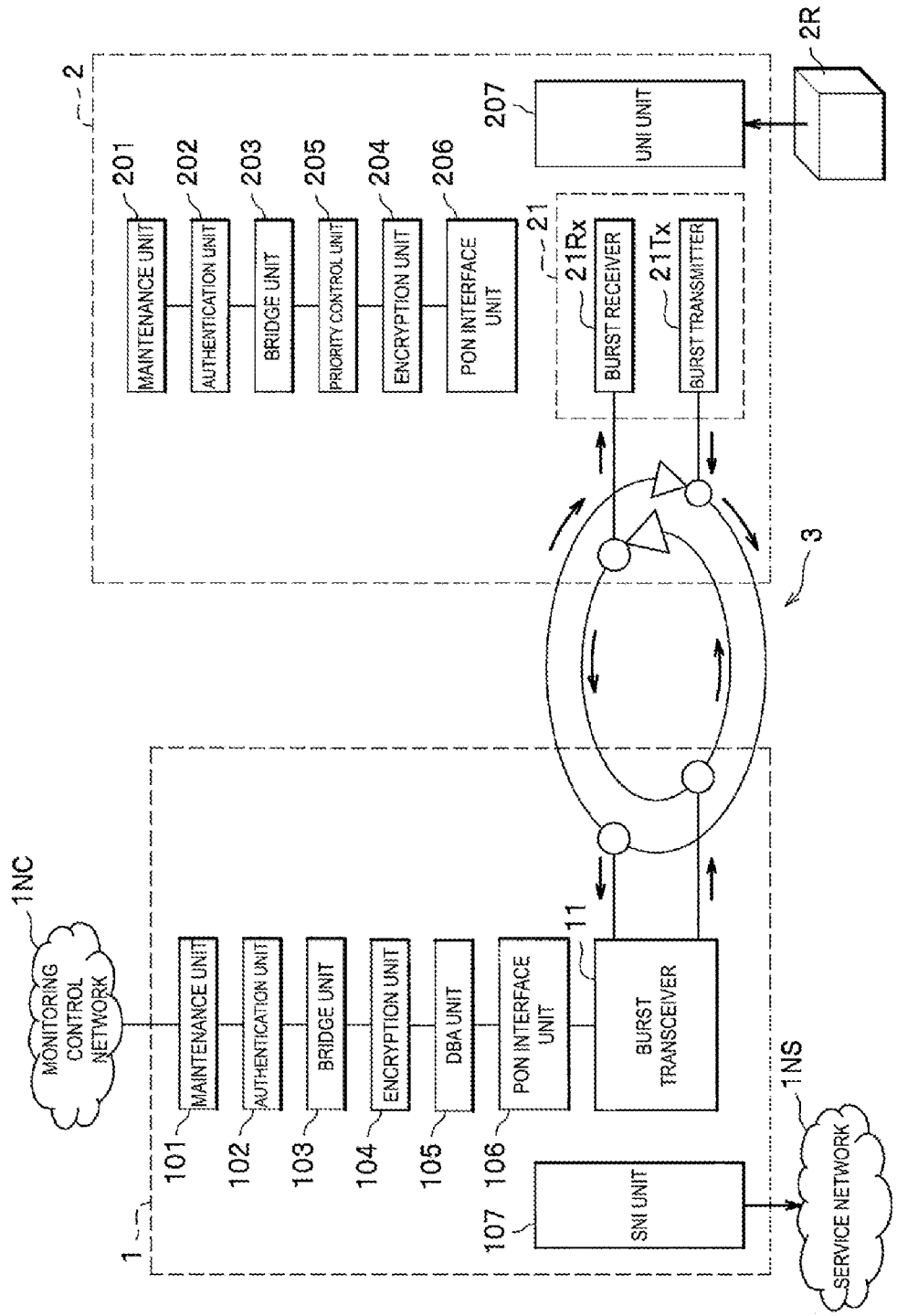
FIG. 2 is a configuration diagram of each node in FIG. 1 according to the present embodiment.

FIG. 2 is a configuration diagram of each node in FIG. 1. The core node 1 includes a maintenance unit 101, which is an interface function between the core node 1 and a monitoring control network 1NC, and an SNI unit 107, which is an interface function between the core node 1 and a service network 1NS, in addition to the burst transceiver 11 connected to the ring network 3 in FIG. 1. Furthermore, the core node 1 includes an authentication unit 102, a bridge unit 103, an encryption unit 104, a DBA unit 105, and a PON interface unit 106.

Each of the access nodes 2 includes a UNI unit 207, which is an interface function between the core node 1 and a higher layer apparatus 2R, such as a PC or a router in a user network, in addition to the burst transceivers 21 (a burst transmitter 21Tx and a burst receiver 21Rx) connected to the ring network 3 in FIG. 1. The access node 2 further includes a maintenance unit 201, an authentication unit 202, a bridge unit 203, an encryption unit 204, a priority control unit 205, and a PON interface unit 206.

The maintenance units 101 and 201 transmit and/or receive operations, administration, maintenance (OAM) control frames.

The authentication unit 102 authenticates the access node 2, and the authentication unit 202 authenticates the core node 1.

The bridge unit 103 performs bridge processing between the service network 11\IS and the ring network 3, and the bridge unit 203 performs bridge processing between the user network and the ring network 3.

The encryption units 104 and 204 perform encryption and decryption processing on the frames. The DBA unit 105 performs uplink band allocation processing.

The priority control unit 205 performs control of a frame transmission sequence, based on priority levels specified in advance.

The PON interface units 106 and 206 have various connection functions with the ring network 3 as those listed below:
- a light transmission and reception function that converts an optical signal in a corresponding section of the ring network 3 and an electrical signal in the apparatus;
- a serializer/deserializer (SerDes) function that performs serial-parallel conversion;
- a physical coding sublayer (PCS) function that performs channel coding and error correction; and
- a PON control function that performs transmission and reception processing for a multi point control protocol (MPCP) control frame, state management processing for a logical link, and time synchronization processing.

Figure 3:
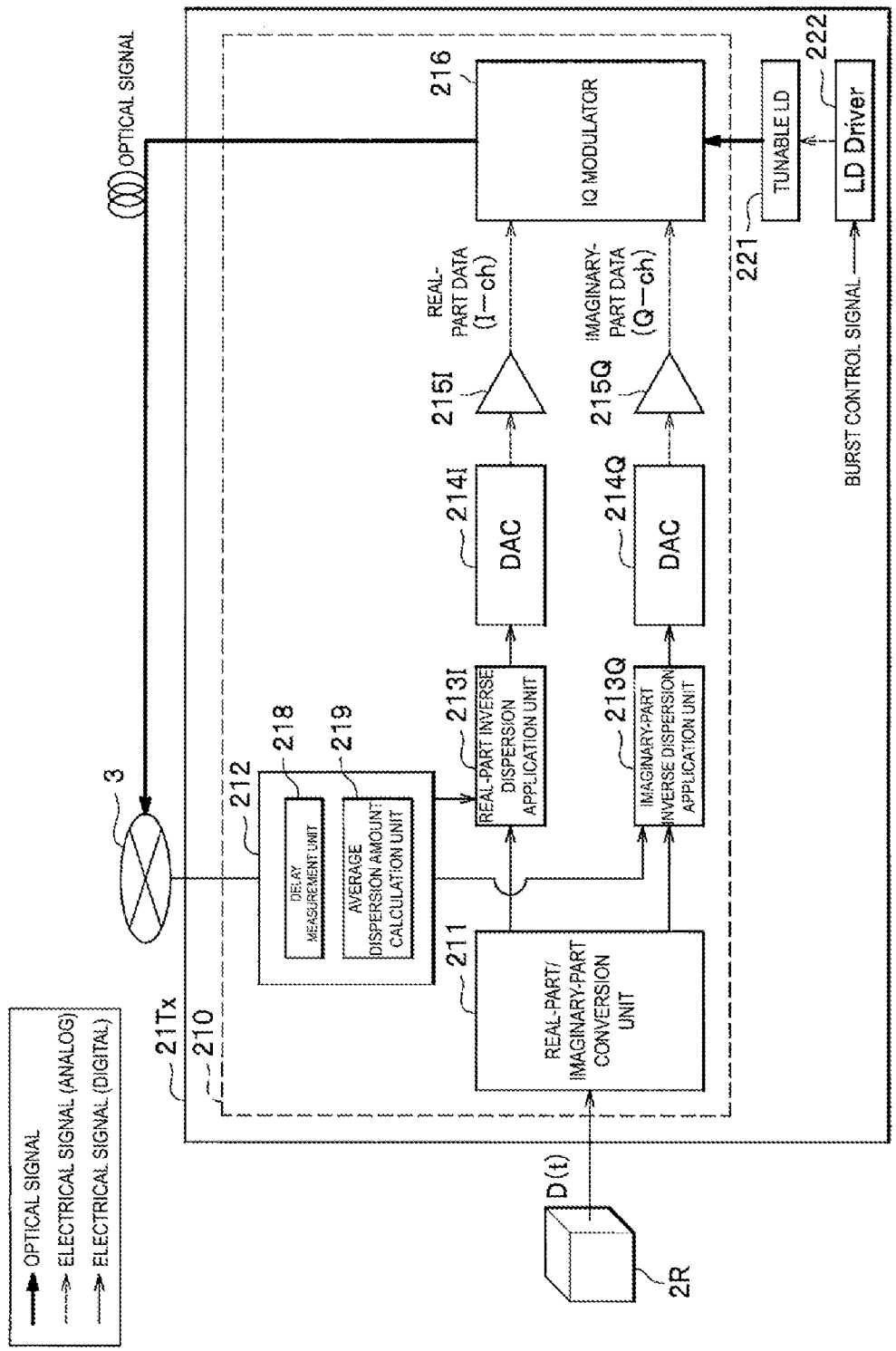
FIG. 3 is a configuration diagram of a burst transmitter in FIG. 2 according to the present embodiment.

FIG. 3 is a configuration diagram of the burst transmitter 21Tx in FIG. 2. The burst transmitter 21Tx includes a pre-dispersion application unit 210, a tunable LD 221, and a LD driver 222. The pre-dispersion application unit 210 includes a real-part/imaginary-part conversion unit 211, a dispersion estimation unit 212, a real-part inverse dispersion application unit 213I, an imaginary-part inverse dispersion application unit 213Q, DACs 214I and 214Q, optical amplifiers 215I and 215Q, and an IQ modulator 216. Note that "I" at the end of each reference sign indicates that the element performs real-part processing, and "Q" at the end of each reference sign indicates that the element that performs imaginary-part processing.

The dispersion estimation unit 212 estimates, before transmission or reception of an optical burst signal serving as a master signal, the amount of dispersion in association with the optical burst signal. The dispersion estimation unit 212 hence includes a delay measurement unit 218 configured to receive delay measurement signals of two different wavelengths, which are slave signals, from the core node 1 and thereby measure a delay from the access node 2 itself to the core node 1, and an average dispersion amount calculation unit 219 configured to calculate an average amount of dispersion to be applied to the optical burst signal, based on the delay determined by the delay measurement unit 218 (details illustrated in FIG. 6). Note that each delay measurement signal is a signal distinguished from the master signal, and is, for example, a short pulse signal or a short burst signal.

The real-part/imaginary-part conversion unit 211 converts digital signal data (bit sequence of 0, 1, 0, . . . D(t)) transmitted from the higher layer apparatus 2R into digital data of a set of real-part data (complex electric field signal I-ch) and imaginary-part data (complex electric field signal Q-ch). The inverse dispersion application units (the real-part inverse dispersion application unit 213I and the imaginary-part inverse dispersion application unit 213Q) receive a notification of the average amount of dispersion from the average dispersion amount calculation unit 219 and adds the average amount of dispersion to the waveform of the real-part data and the waveform of the imaginary-part data as the amount of dispersion compensation of inverse dispersion (pre-equalization).

In this manner, the pre-dispersion application unit 210 electrically applies, at the time of transmission of an optical burst signal, the amount of dispersion compensation necessary at the time of reception of the optical burst signal (the average amount of dispersion) to the optical burst signal and outputs the optical burst signal to thereby compensate for dispersion of the optical burst signal. Consequently, no dispersion compensating module is needed or simple compensation is sufficient in the core node 1, which is the reception side of the optical burst signal, and therefore, a transmission loss can be suppressed in addition to achieving reductions in size and cost.

Note that details of the processing of pre-equalizing inverse dispersion by the real-part inverse dispersion application unit 213I and the imaginary-part inverse dispersion application unit 213Q are as follows. Each of the real-part inverse dispersion application unit 213I and the imaginary-part inverse dispersion application unit 213Q executes, as a digital operation necessary for pre-dispersion compensation, an operation (convolution) for subjecting an electrically generated electrical waveform to convolution with an inverse transfer function H(ω) of the transmission line as inverse characteristics. Equation 1 below is a formula of the convolution.

[Math. 1]

$$D(t) \otimes H(w)$$

$$H(\omega) = \exp(j\beta L \omega^2 / 2) \quad \text{(Equation 1)}$$

H (ω) . . . inverse transfer function of transmission line dispersion
ω . . . optical angular frequency difference from center of optical signal
β . . . dispersion coefficient
L . . . transmission distance
β×L . . . average amount of dispersion Note that a method for calculating dispersion coefficient β is, for example, any of the following methods:
- a lookup table method in which a conversion table is stored in a large-scale memory in advance; and
- a method for performing calculation when necessary by using a FIR filter with a complex coefficient.

As described above, the calculation processing of the real-part/imaginary-part conversion unit 211, the real-part inverse dispersion application unit 213I, and the imaginary-part inverse dispersion application unit 213Q is desirably performed in digital signal processing (DSP). Each of the high-speed digital to analog converters (DACs) 214I and 214Q then converts corresponding one of the pre-equalized real-part data and imaginary-part data into a signal of an analog electrical waveform. Each of the optical amplifiers 215I and 215Q amplifies corresponding one of the real-part data and imaginary-part data of the analog signals.

The IQ modulator 216 modulates the real-part data and the imaginary-part data of the amplified analog signals into an optical burst signal having a complex electric field specified by a laser beam from the tunable LD 221 (i.e., an optical transmission signal subjected to pre-dispersion compensation), and then transmits the modulated optical burst signal to the ring network 3. Note that the laser beam from the tunable LD 221 is controlled by a burst control signal provided via the LD driver 222.

Figure 4:
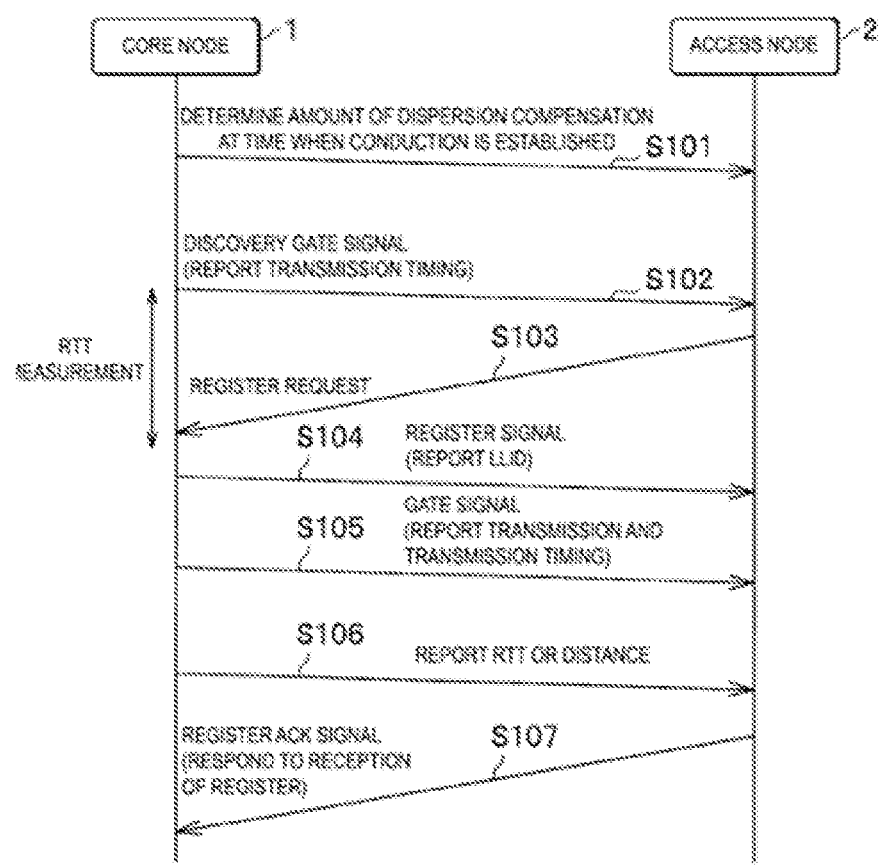
FIG. 4 is a sequence diagram illustrating processing from the time when conduction of the dispersion compensating system is established to the time of discovery according to the present embodiment.

FIG. 4 is a sequence diagram illustrating processing from the time when conduction of the dispersion compensating system is established to the time of discovery. As described in S101 to S107 below, when a new access node 2 is connected to the ring network 3, the core node 1 automatically discovers the newly conducting access node 2 and performs "point-to-multipoint (P2MP) discovery" for adding a logical link ID (LLID) to the access node 2.

Figure 5:
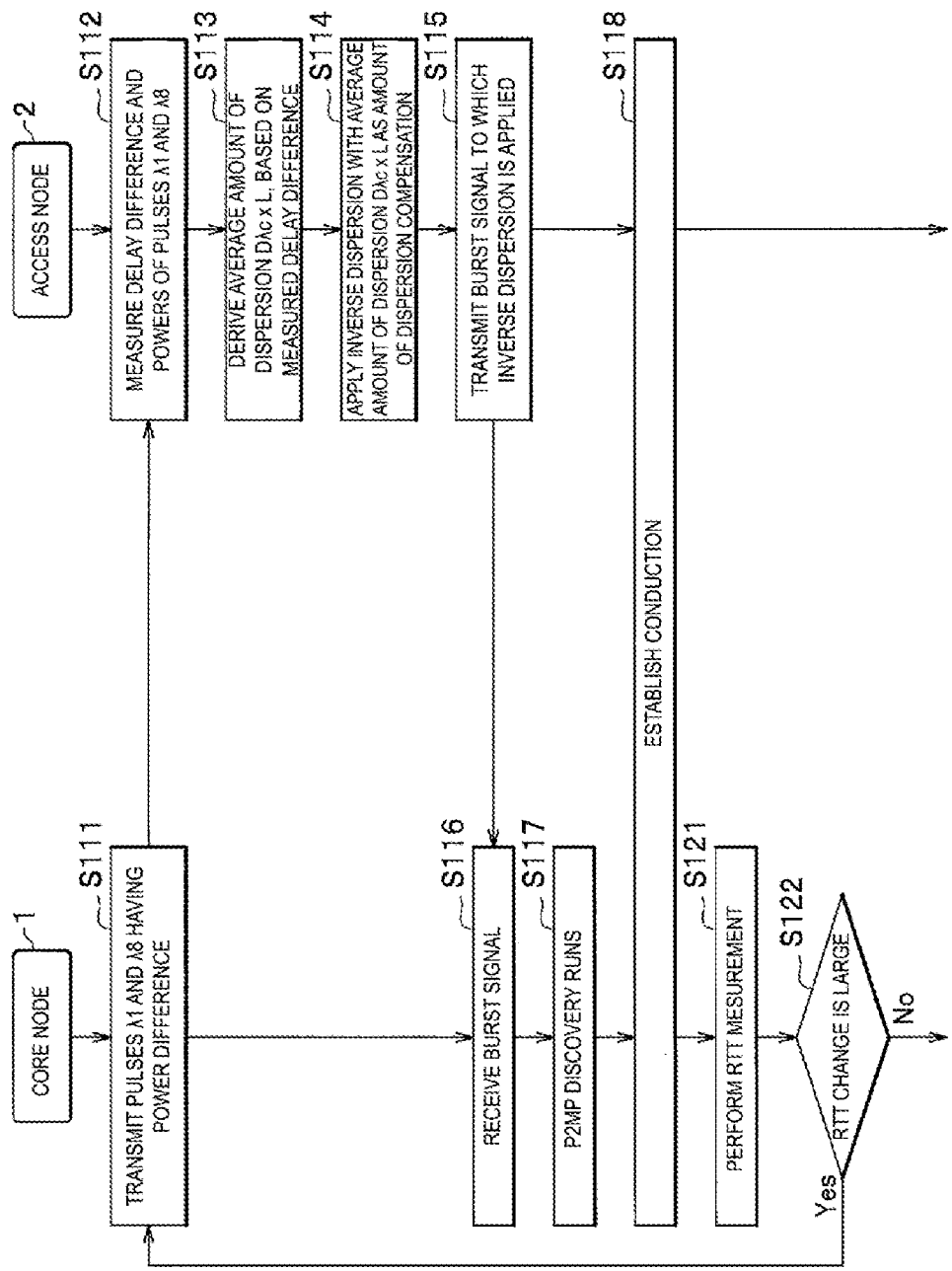
FIG. 5 is a sequence diagram focusing on the time when conduction is established in the sequence diagram of FIG. 4 according to the present embodiment.

At the time when conduction of the access node 2 is established, the core node 1 determines the amount of pre-dispersion compensation (S101, details illustrated in FIG. 5). The core node 1 transmits a discovery GATE signal for reporting a transmission timing to the new access node 2 (S102).

When receiving a register request from the access node 2 as a response to S102 (S103), the core node 1 measures a round trip time (RTT), which is a frame round-trip time from the time of signal transmission in S102 to the time of signal reception in S103, to synchronize the nodes in terms of time point. Note that the measurement of the frame round-trip time and the time synchronization are performed hereafter on a regular basis as well as at the time when conduction is established, and if a time difference occurs due to a change in line conditions or the like, the time difference is corrected as needed.

The core node 1 transmits a register signal for reporting the LLID (S104) and transmits a GATE signal for reporting the transmission and the transmission timing (S105), to the new access node 2.

The core node 1 then reports the frame round-trip time (RTT) or the distance between the core node 1 and the new access node 2 (S106), and receives a register ACK signal, which is a reception response to the register signal in S104.

As described above, in the processing at the time of discovery illustrated in FIG. 4, the frame round-trip time is measured for time synchronization. The delay measurement unit 218 of the pre-dispersion application unit 210 can thus acquire the frame round-trip time measured for time synchronization to recycle the frame round-trip time for calculating an average amount of dispersion to be applied to the real-part inverse dispersion application unit 213I and the imaginary-part inverse dispersion application unit 213Q, and thereby make fine adjustments of the amount of dispersion compensation as needed.

In other words, to acquire the latest delay data, the delay measurement unit 218 makes use of the existing discovery processing without additionally activating new measurement processing, and this can prevent additional load from being imposed on the control processing of each node.

FIG. 5 is a sequence diagram focusing on the time when conduction is established in S101 in the sequence diagram of FIG. 4.

Figure 6:
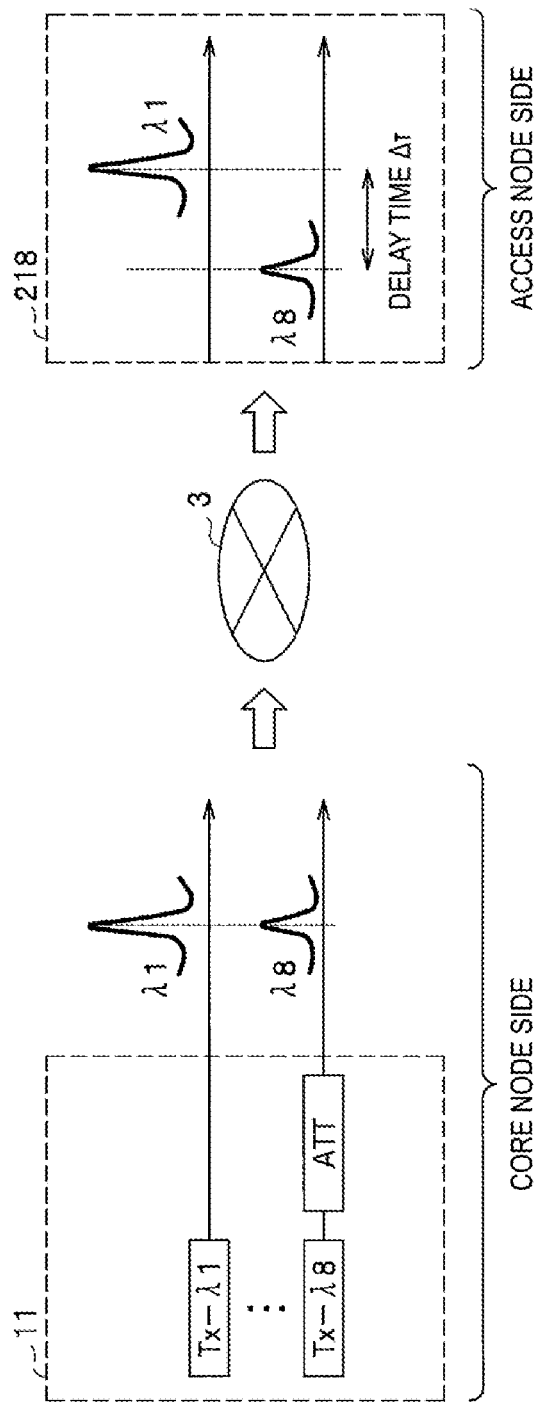
FIG. 6 is an explanatory diagram of pulses serving as delay measurement signals in FIG. 5 according to the present embodiment.

The core node 1 transmits pulses $\lambda 1$ and $\lambda 8$, which are delay measurement signals having a power difference, to each access node 2, the pulse $\lambda 1$ having a larger power, the pulse $\lambda 8$ having a smaller power (S111, details illustrated in FIG. 6). The delay measurement unit 218 of each access node 2 measures the delay difference and powers of the pulses $\lambda 1$ and $\lambda 8$ in S111 (S112).

Figure 7:
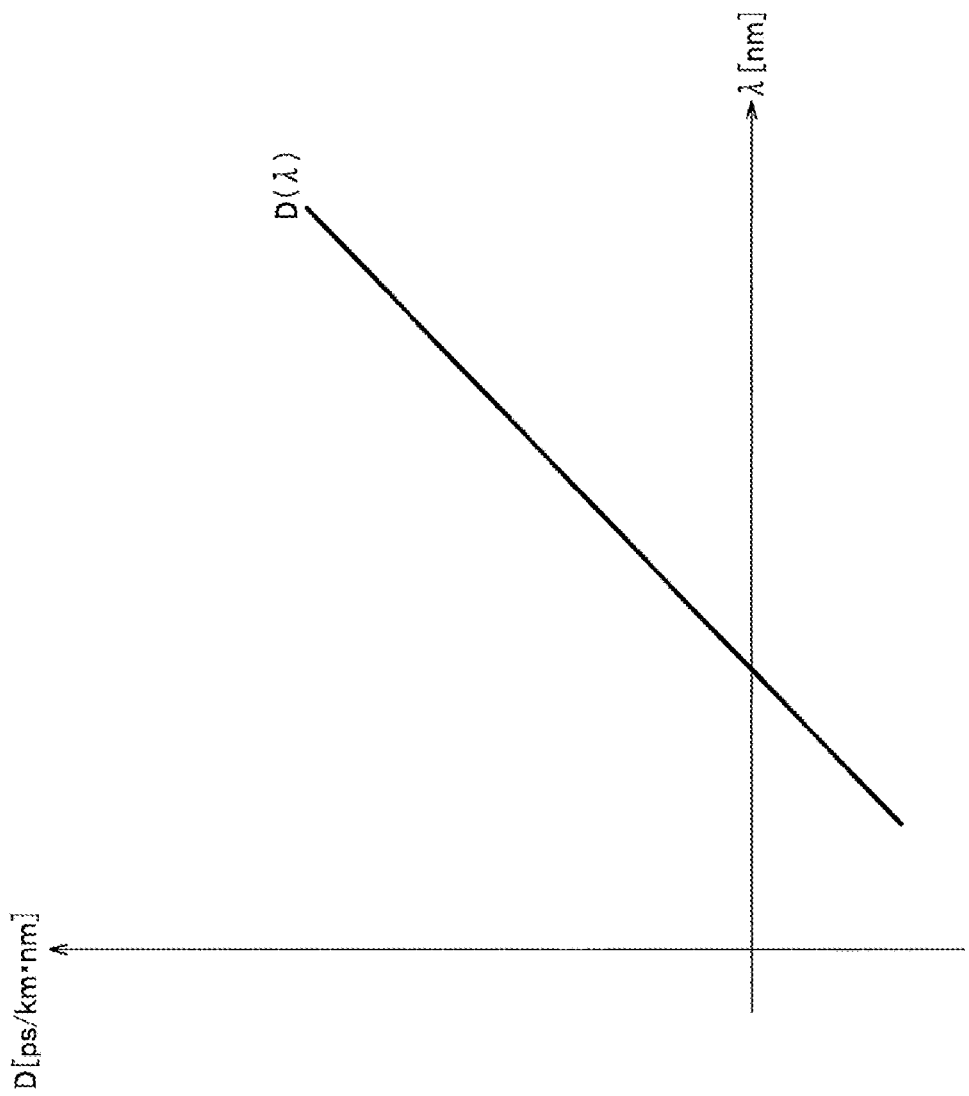
FIG. 7 is a graph for describing details of calculation by an average dispersion amount calculation unit in FIG. 5 according to the present embodiment.
Figure 8:
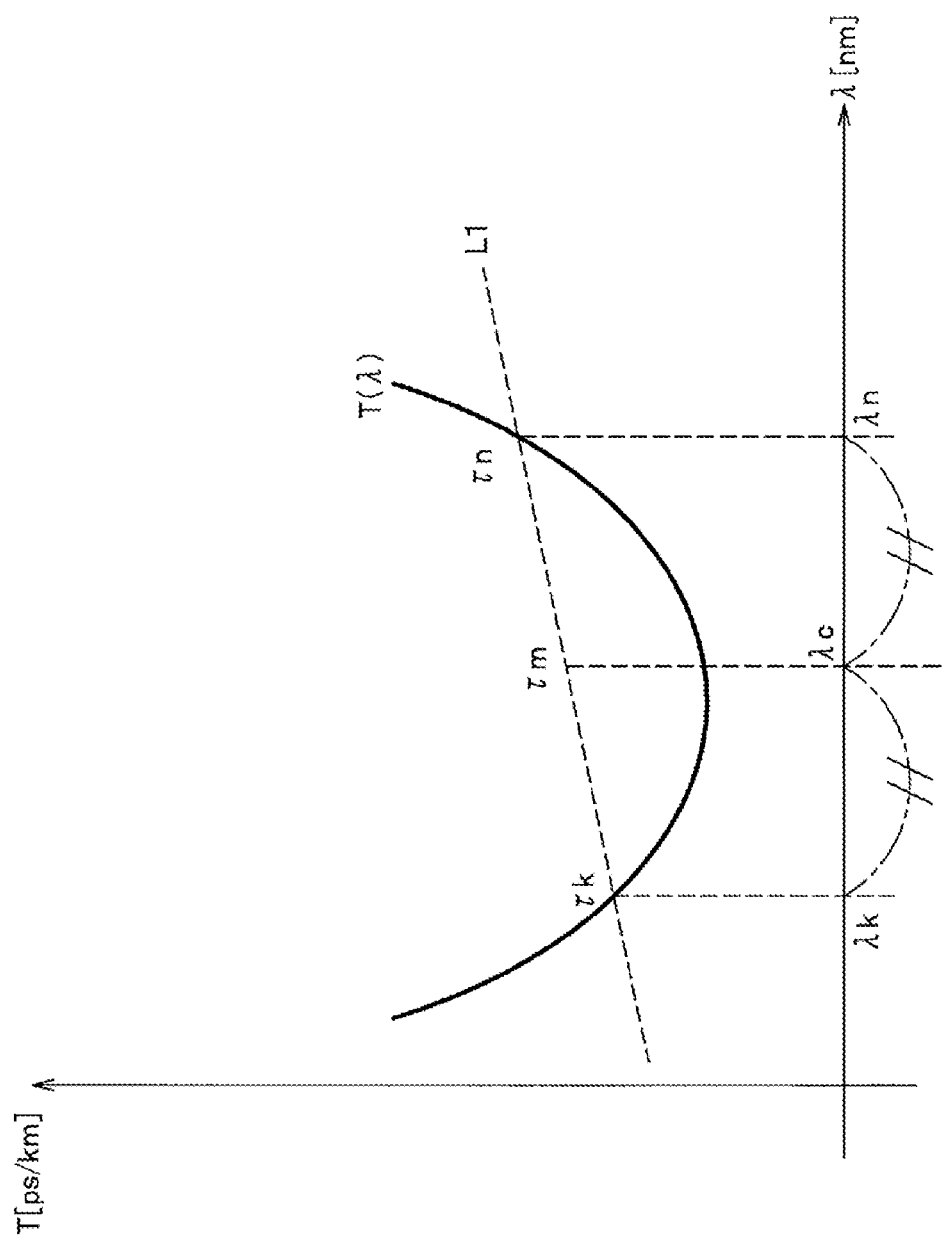
FIG. 8 is a graph obtained by changing an axis of a graph with respect to a line $D(\lambda)$ in FIG. 7 according to the present embodiment.
Figure 9:
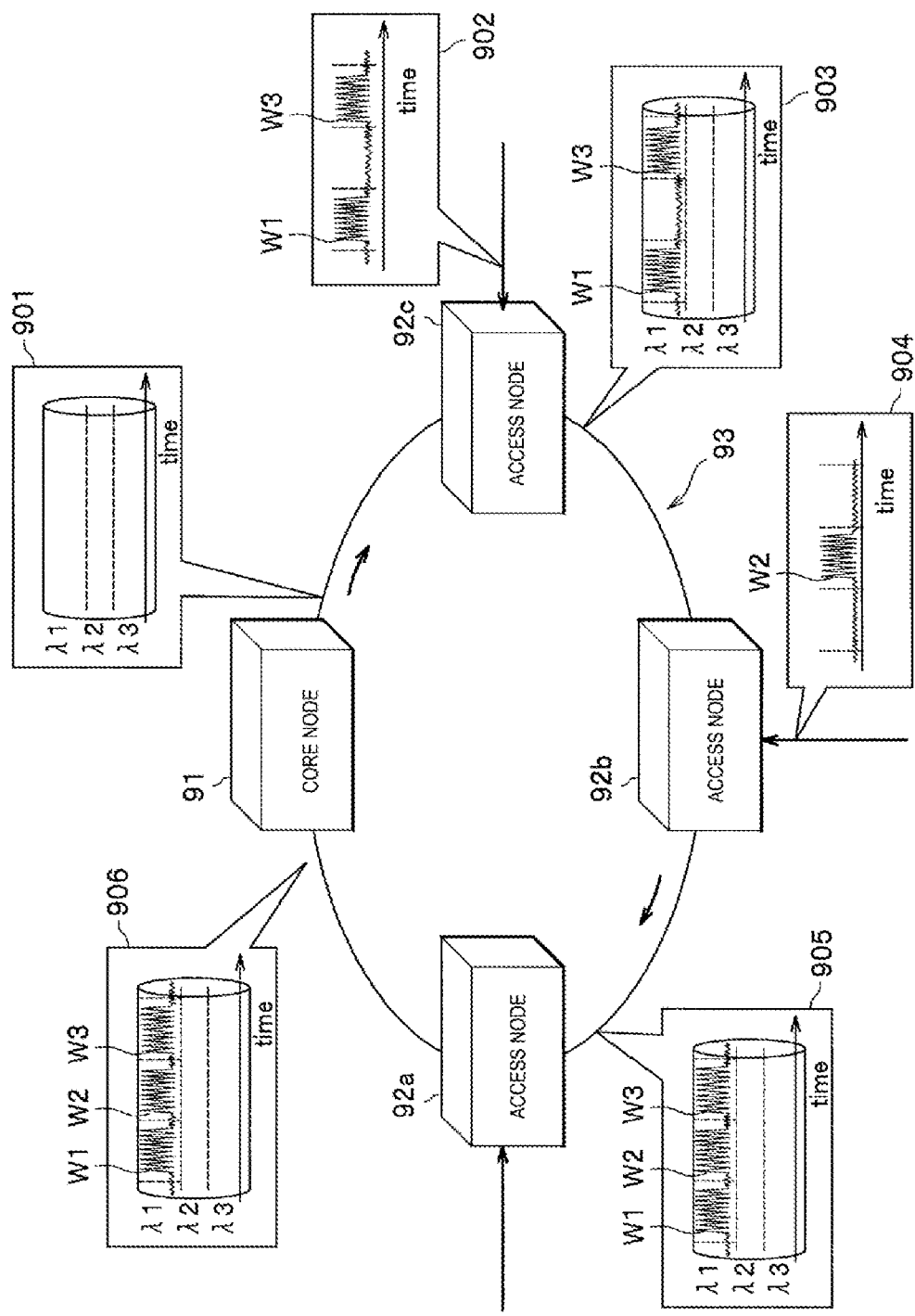
FIG. 9 is a configuration diagram illustrating an example of an aggregation optical ring system.
Figure 10:
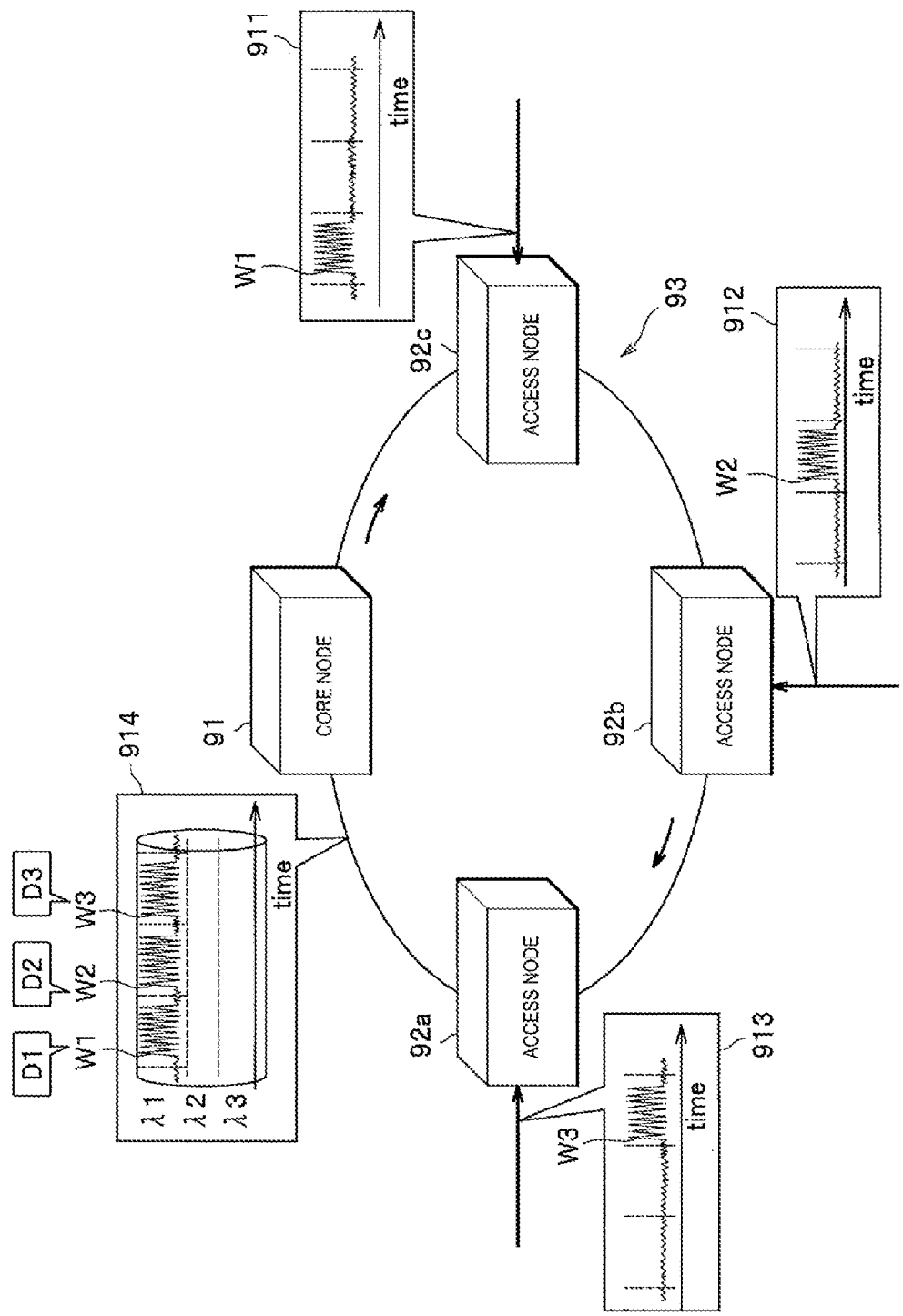
FIG. 10 is an explanatory diagram of wavelength dispersion occurring at the time of fiber transmission in the aggregation optical ring system in FIG. 9.

The average dispersion amount calculation unit 219 of each access node 2 derives an average amount of dispersion $D_{\lambda c} \times L$ between the pulses $\lambda 1$ and $\lambda 8$, based on the delay difference measured in S112 (S113, details illustrated in FIG. 7 and FIG. 8). The average dispersion amount calculation unit 219 then indicates to the real-part inverse dispersion application unit 213I and the imaginary-part inverse dispersion application unit 213Q that inverse dispersion using the average amount of dispersion $D_{\lambda c} \times L$ as the amount of dispersion compensation is performed on the optical burst signal before transmission.

The pre-dispersion application unit 210 transmits an optical burst signal subjected to the inverse dispersion in S114 to the ring network 3 (S115). The burst transceiver 11 of the core node 1 receives an optical burst signal subjected to the dispersion compensation in S115. In this manner, pre-dispersion compensation is performed at the time of transmission in S115, and hence it is easy to change the amount of dispersion compensation in each burst.

The P2MP discovery illustrated in FIG. 4 runs from the core node 1 (S117) to complete the establishment of the conduction between the core node 1 and the access node 2 (S118). When the frame round-trip time (RTT) is measured in this P2MP discovery, and the RTT has a significant change from the result of the previous measurement (S122, Yes), the processing returns to the delay measurement processing in S111 on the assumption that the distance to pass (the amount of dispersion) between the core node 1 and the access node 2 is changed. Alternatively, the delay measurement processing in S111 may be executed again also in a case where the state of the transmission line of the ring network 3 is changed.

FIG. 6 is an explanatory diagram of the pulses $\lambda 1$ and $\lambda 8$, which are delay measurement signals illustrated in S111 in FIG. 5.

In addition to the ($\lambda 1, \ldots, \lambda 8$) transmitters Tx-$\lambda 1$, Tx-$\lambda 8$ for respective wavelengths, the burst transceiver 11 of the core node 1 includes a fixed attenuator ATT for applying a power difference between $\lambda 1$ and $\lambda 8$, at an output unit of the transmitter Tx-$\lambda 8$.

The core node 1 transmits the shortest wavelength pulse $\lambda 1$ and the longest wavelength pulse $\lambda 8$ as downlink signals to the access node 2. Then, the pulses $\lambda 1$ and $\lambda 8$ transmitted to the access node 2 through the ring network 3 are subjected to measurement by the delay measurement unit 218 of the access node 2 to measure a delay time $\Delta \tau$.

FIG. 7 is a graph for illustrating details of calculation by the average dispersion amount calculation unit 219 illustrated in S113 in FIG. 5. The horizontal axis of the graph represents a wavelength $\lambda$, and the vertical axis of the graph represents the amount of dispersion D.

The dispersion characteristics $D\lambda c$ [ps/nm·km] at a certain center wavelength $\lambda c$ [nm] is calculated according to the calculation formula "$D\lambda c \times L = \Delta \tau / \Delta \lambda$". Note that L denotes a span distance [km], and $\tau$ denotes a group delay [ps]. Note that the straight line $D(\lambda)$ in FIG. 7 corresponds to Equation 2 below.

[Math. 2]

$$D(\lambda) = \frac{dD}{d\lambda}(\lambda - \lambda_0) \quad \text{(Equation 2)}$$

FIG. 8 is a graph obtained by changing an axis of the graph with respect to the straight line D(λ) in FIG. 7. A curve T(λ) in FIG. 8 corresponds to Equation 3 below and is obtained by modifying Equation 2.

[Math. 3]

$$T(\lambda) = \frac{1}{2}\frac{dD}{d\lambda}(\lambda - \lambda_0)^2 + C \quad \text{(Equation 3)}$$

Assume that the points on the curve T(λ) corresponding to points λk and λn on the horizontal axis are defined as τk and τn. λc denotes the center wavelength of λn and λk, and λn–λk is known information. A straight line L1 connects τk and τn. The point on the straight line L1 corresponding to the point λc on the horizontal axis is defined as τm.

Note that Equation 2 can be converted to the calculation formula "Δτ/Δλ=(τn–τk)/(λn–λk)". Thus, by measuring a light arrival delay difference between λn and λk, the average amount of dispersion for λn and λk (the amount of dispersion at λc) can be derived as τm.

In the present embodiment, C-band with 8 waves is targeted for the compensation, and compensation can be sufficiently performed with the amount of dispersion compensation at λc because the wavelength dependency of the amount of dispersion is not large. In other words, the average dispersion amount calculation unit 219 derives the average amount of dispersion of the two wavelengths according to the following equation.

(Average amount of dispersion)=(delay time Δτ[ps])/
(λ1–λ8 [nm])

In the present embodiment described above, before an optical burst signal is transmitted to the core node 1, the pre-dispersion application unit 210 in the access node 2 estimates the amount of dispersion for the optical burst signal, based on a delay time. The pre-dispersion application unit 210 then performs pre-equalization on the optical burst signal before transmission through inverse dispersion with the estimated amount of dispersion.

As a result of this, the optical burst signal with an appropriate amount of dispersion compensation is transmitted, and no network design pre-assuming the amount of dispersion compensation is needed, whereby operation costs can also be reduced.

Note that in the present embodiment, it is assumed that, as illustrated in FIG. 1, one core node 1 and three access nodes 2 are connected to the ring network 3 according to the present disclosure. However, the present disclosure is not limited to these numbers and the configuration. The present disclosure can be implemented by a program that causes a hardware resource of a general computer to operate as each means of the core node 1 and the access nodes 2. The program may also be distributed over a communications line, or may be recorded and distributed on a recording medium such as a CD-ROM.

REFERENCE SIGNS LIST

1 Core node
2 Access node
3 Ring network
11 Burst transceiver
21 Burst transceiver
21Tx Burst transmitter
21Rx Burst receiver
101 Maintenance unit
102 Authentication unit
103 Bridge unit
104 Encryption unit
105 DBA unit
106 PON interface unit
107 SNI unit
201 Maintenance unit
202 Authentication unit
203 Bridge unit
204 Encryption unit
205 Priority control unit
206 PON interface unit
207 UNI unit
210 Pre-dispersion application unit
211 Real-part/imaginary-part conversion unit
212 Dispersion estimation unit
213I Real-part inverse dispersion application unit (inverse dispersion application unit)
213Q Imaginary-part inverse dispersion application unit (inverse dispersion application unit)
214 DAC
215I Optical amplifier
215Q Optical amplifier
216 IQ modulator
218 Delay measurement unit
219 Average dispersion amount calculation unit (dispersion compensation amount calculation unit)
221 Tunable LD
222 LD driver

The invention claimed is:

1. A dispersion compensating system comprising:
a core node and an access node that are connected through a ring network constituted of an optical fiber, the access node including:
a delay measurement unit, including at least one central processing unit, configured to receive delay measurement signals from the core node to measure a delay between the core node and the access node;
a dispersion compensation amount calculation unit, including at least one central processing unit, configured to calculate an amount of dispersion compensation to be applied to an optical burst signal prior to transmission to the ring network, based on the measured delay thus measured; and
an inverse dispersion application unit, including at least one central processing unit, configured to perform pre-equalization on a waveform of the optical burst signal prior to the transmission, based on the calculated amount of dispersion compensation, wherein:
the delay measurement unit of the access node is configured to use, as the delay between the core node and the access node, a delay measured for time synchronization between the core node and the access node in discovery processing activated based on a new instance of the access node being connected to the ring network.

2. The dispersion compensating system according to claim 1, wherein:

the core node is configured to transmit, to the access node, transmits two signals of a plurality of wavelengths and different powers as the delay measurement signals, to the access node, and the dispersion compensation amount calculation unit of the access node is configured to calculate calculates an amount of dispersion compensation at a center wavelength between the wavelengths of the two signals.

3. A dispersion compensating method executed by a dispersion compensating system including a core node and an access node that are connected through a ring network constituted of an optical fiber, the access node including a delay measurement unit, a dispersion compensation amount calculation unit, and an inverse dispersion application unit, the dispersion compensating method comprising:

receiving, by at least one central processing unit of the delay measurement unit, delay measurement signals from the core node to measure a delay between the core node and the access node;

calculating, by at least one central processing unit of the dispersion compensation amount calculation unit, an amount of dispersion compensation to be applied to an optical burst signal prior to transmission to the ring network, based on the measured delay thus measured;

performing, by at least one central processing unit of the inverse dispersion application unit, pre-equalization on a waveform of the optical burst signal prior to the transmission, based on the calculated amount of dispersion compensation; and using, by the delay measurement unit of the access node as the delay between the core node and the access node, a delay measured for time synchronization between the core node and the access node in discovery processing activated based on a new instance of the access node being connected to the ring network.

4. The dispersion compensating method according to claim 3, further comprising:

transmitting, by the core node to the access node, two signals of a plurality of wavelengths and different powers as the delay measurement signals, and calculating, by the dispersion compensation amount calculation unit, an amount of dispersion compensation at a center wavelength between the wavelengths of the two signals.

\* \* \* \* \*